US008297969B2

(12) United States Patent
Daneri et al.

(10) Patent No.: US 8,297,969 B2
(45) Date of Patent: Oct. 30, 2012

(54) LOW POLLUTING EMISSION GAS BURNER

(75) Inventors: Marco Daneri, Genoa (IT); Pierpaolo Pastorino, Albenga-Savona (IT); Vittorio Laviosa, Mele-Genoa (IT); Massimiliano Fantuzzi, Genoa (IT); Umberto Zanusso, Genoa (IT); Enrico Malfa, Zanica-Bergamo (IT)

(73) Assignee: Techint Compagnia Tecnica Internazionale S.p.A., Milan (IT)

( * ) Notice: Subject to any disclaimer, the term of this patent is extended or adjusted under 35 U.S.C. 154(b) by 1139 days.

(21) Appl. No.: 10/580,138

(22) PCT Filed: Nov. 25, 2004

(86) PCT No.: PCT/EP2004/013406
§ 371 (c)(1),
(2), (4) Date: May 19, 2006

(87) PCT Pub. No.: WO2005/052446
PCT Pub. Date: Jun. 9, 2005

(65) Prior Publication Data
US 2007/0072141 A1 Mar. 29, 2007

(30) Foreign Application Priority Data
Nov. 28, 2003 (IT) ............... MI2003A2327

(51) Int. Cl.
*F23N 1/00* (2006.01)
*F23L 15/00* (2006.01)
*F23C 6/02* (2006.01)
*F23C 7/06* (2006.01)
*F23D 5/08* (2006.01)
*F23D 5/00* (2006.01)

(52) U.S. Cl. ............... 431/284; 431/6; 431/8; 431/278; 431/285; 431/350; 431/11

(58) Field of Classification Search .................. 431/2, 6, 431/11, 278, 350, 8, 280, 283, 284, 285
See application file for complete search history.

(56) References Cited

U.S. PATENT DOCUMENTS
2,478,092 A * 8/1949 Edge .............................. 432/206
(Continued)

FOREIGN PATENT DOCUMENTS
AT 358702 9/1980
(Continued)

OTHER PUBLICATIONS
International Search Report, Mar. 11, 2005.

*Primary Examiner* — Carl Price
(74) *Attorney, Agent, or Firm* — Hedman & Costigan, P.C.; James V. Costigan

(57) ABSTRACT

Gas burner (1) comprising a main metal body (6), an inner lance (11) for combustible gas, at least two outer lances (10) for combustible gas, a single duct (8) for conveying preheated air, a regulation system for the combustible gas, a refractory unit (30), characterized in that said gas burner (1) comprises a series of nozzles (20) for the injection of the preheated air into the combustion chamber, and in that, by operating on the gas regulation system, it is possible to switch, with continuity, from a flame functioning mode of the burner to a flameless functioning mode, the latter characterized by low emissions of polluting agents.

28 Claims, 10 Drawing Sheets

U.S. PATENT DOCUMENTS

| | | | | |
|---|---|---|---|---|
| 3,224,487 | A * | 12/1965 | McInerney et al. | 431/79 |
| 3,418,062 | A * | 12/1968 | Hovis et al. | 431/350 |
| 3,476,368 | A * | 11/1969 | Saiki | 432/178 |
| 3,734,675 | A * | 5/1973 | Osburn | 431/12 |
| 3,958,413 | A * | 5/1976 | Cornelius et al. | 60/778 |
| 3,973,395 | A * | 8/1976 | Markowski et al. | 60/733 |
| 4,181,491 | A * | 1/1980 | Hovis | 431/187 |
| 4,287,857 | A * | 9/1981 | Schnitzer | 122/23 |
| 4,292,801 | A * | 10/1981 | Wilkes et al. | 60/776 |
| 4,353,712 | A * | 10/1982 | Marion et al. | 48/197 R |
| 4,420,929 | A * | 12/1983 | Jorgensen et al. | 60/776 |
| 4,475,885 | A * | 10/1984 | Finke | 431/182 |
| 4,586,894 | A * | 5/1986 | Wunning | 431/158 |
| 4,643,672 | A * | 2/1987 | Lefebvre | 431/265 |
| 4,657,504 | A * | 4/1987 | Akiyama et al. | 431/166 |
| 4,797,087 | A * | 1/1989 | Gitman | 431/10 |
| 5,054,280 | A * | 10/1991 | Ishibashi et al. | 60/776 |
| 5,154,599 | A * | 10/1992 | Wunning | 431/215 |
| 5,344,307 | A | 9/1994 | Schwartz et al. | |
| 5,542,839 | A * | 8/1996 | Kelly | 431/10 |
| 5,554,022 | A | 9/1996 | Nabors, Jr. et al. | |
| 5,570,679 | A * | 11/1996 | Wunning | 126/91 A |
| 5,647,739 | A * | 7/1997 | McDonald | 431/352 |
| 5,846,067 | A * | 12/1998 | Nishiyama et al. | 431/115 |
| 5,980,243 | A | 11/1999 | Surbey et al. | |
| 6,033,208 | A * | 3/2000 | Wunning | 431/215 |
| 6,068,468 | A | 5/2000 | Philippe et al. | |
| 6,126,438 | A | 10/2000 | Joshi et al. | |
| 6,606,969 | B2 * | 8/2003 | Wunning | 122/235.13 |
| 6,638,061 | B1 * | 10/2003 | Cain et al. | 432/14 |
| 6,652,265 | B2 * | 11/2003 | Cain | 431/6 |
| 6,824,383 | B2 * | 11/2004 | Cain | 431/12 |
| 7,175,423 | B1 * | 2/2007 | Pisano et al. | 431/10 |
| 2003/0008255 | A1 * | 1/2003 | Finke et al. | 431/215 |
| 2003/0189967 | A1 * | 10/2003 | Rumelin et al. | 374/31 |

FOREIGN PATENT DOCUMENTS

| | | | |
|---|---|---|---|
| DE | 19740788 C1 | * | 9/1998 |
| DE | 19752335 A1 | * | 5/1999 |
| EP | 592223 A1 | * | 4/1994 |
| EP | 725251 A1 | * | 8/1996 |
| EP | 756135 A1 | * | 1/1997 |
| EP | 875716 A2 | * | 11/1998 |
| GB | 2040031 A | * | 8/1980 |
| JP | 54055214 A | * | 5/1979 |
| JP | 07190319 A | * | 7/1995 |
| JP | 07332624 A | * | 12/1995 |
| JP | 08135912 A | * | 5/1996 |
| JP | 08247410 A | * | 9/1996 |
| WO | WO 03036064 A1 | * | 5/2003 |

* cited by examiner

LOW POLLUTING EMISSION GAS BURNER

The present invention relates to a gas burner, in particular a burner with low polluting emissions of nitrogen oxides.

It is common practice, in the case of combustion chambers operating at high temperatures, to recuperate part of the heat from the combustion fumes by the pre-heating of the combustive air.

The tendency, at present, is to increase the pre-heating temperature in order to increase the efficiency of the oven.

This objective is opposed by the tendency of an increase in the polluting emissions of NOx, which is known to be a function of the maximum flame temperature.

Furthermore, it is necessary to reduce polluting emissions as much as possible, as the limits of the NOx concentration in the fumes discharged, which burner manufacturers must guarantee in order to comply with national and international regulations, are continuously decreasing, mainly as a result of USA market requests.

Emissions lower than 100 ppm are currently required and it is predicted that in the near future their values will have to range from 20-30 ppm even in the presence of air pre-heated to 500° C.

To achieve this objective, resort has been made in the last few years to "diluted combustion" and, more recently, to flameless combustion.

In order to be able to operate according to the above combustion regime, it is necessary to have an operating temperature permanently above the self-ignition temperature of the combustible material, which, in the case of natural gas, is about 850° C.

It is therefore generally necessary to have a burner equipped with a "pilot" i.e. a device capable of pre-heating the oven to that temperature.

A specific characteristic of flameless burners is the capacity of providing a particularly uniform heat flow and temperature profile in the combustion chamber, which is certainly advantageous for heating and thermal treatment ovens.

The burner, however, on which the behaviour of the oven generally depends and especially for plants running in continuous, must allow a wide flexibility in terms of charge regulation (turn-down) and thermal profile.

It is well known that in combustion systems (burners) used in industrial ovens where a combustible gas reacts with the oxygen present in the combustion air, the NOx emissions are almost entirely due to thermal NOx whose formation is influenced both by geometrical factors which are characteristic of each single burner, and by operative factors such as air excess, pre-heating temperature of the combustion air and operating temperature of the oven.

It is generally known that, during regime combustion reactions, the production of NOx, in the case of gaseous fuels free of bound nitrogen, is due to the presence of extremely high temperature peaks, caused by a high local concentration of oxygen, due, in turn, to a non-efficient mixing of the combustible matter, the comburent and combustion products.

Possible means for controlling the formation of thermal NOx are traditionally:
stage combustion (of the type "air staging" and "fuel staging") and diluted combustion.

More recently a new technique has been developed, known as flameless combustion, which can be considered as being the evolution of dilute combustion and is technologically based on the recycling of the gas combusted inside the combustion chamber of the oven, obtained by an exasperation of air staging.

This solution, however, has a high cost due to the use of control valves, installed on the feeding line of the hot comburent air, adopted for distributing the flow rate of air into the fractions envisaged by the staging.

Burners which currently allow the flame mode to be coupled with the flameless mode, require distribution systems of the comburent air.

A general objective of the present invention is to solve the above-mentioned drawbacks of the known art in a very simple, economical and particularly functional way.

Another objective is to provide a gas burner, capable of maintaining said very low emissions within a wide functioning range, and which is also capable of easily modifying the thermal profile inside the combustion chamber.

In view of the above objectives, according to the present invention, a gas burner has been conceived, with the characteristics expressed in the enclosed claims.

The structural and functional characteristics of the present invention and its advantages with respect to the known art will appear clearer and more evident from an examination of the following description, referring to the enclosed drawings, which show a low polluting emission burner produced in accordance with the innovative principles of the invention itself.

Figure 1:
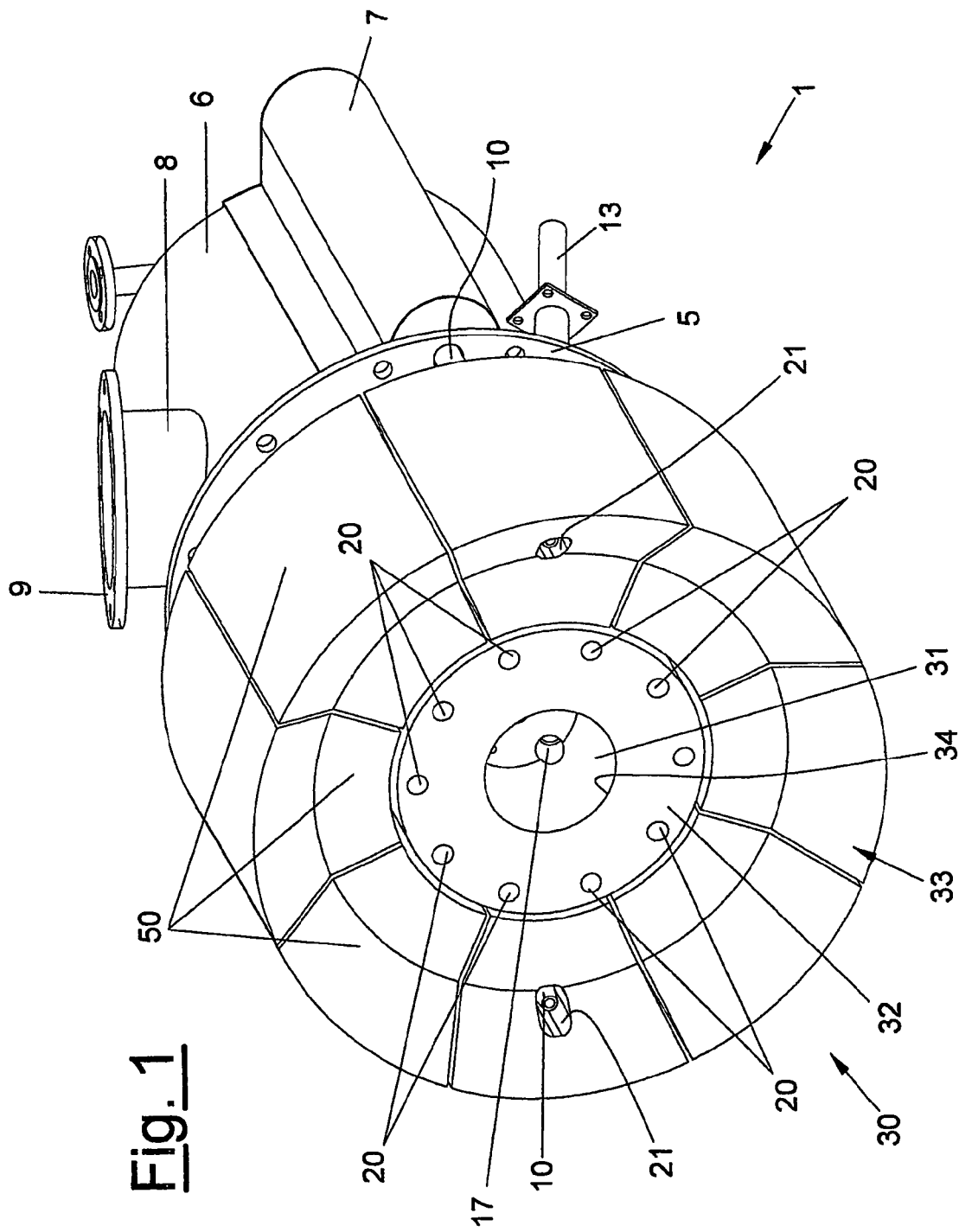
FIG. 1 shows a raised perspective right-side view, from above, of an embodiment of a gas burner according to the present invention.
Figure 2:
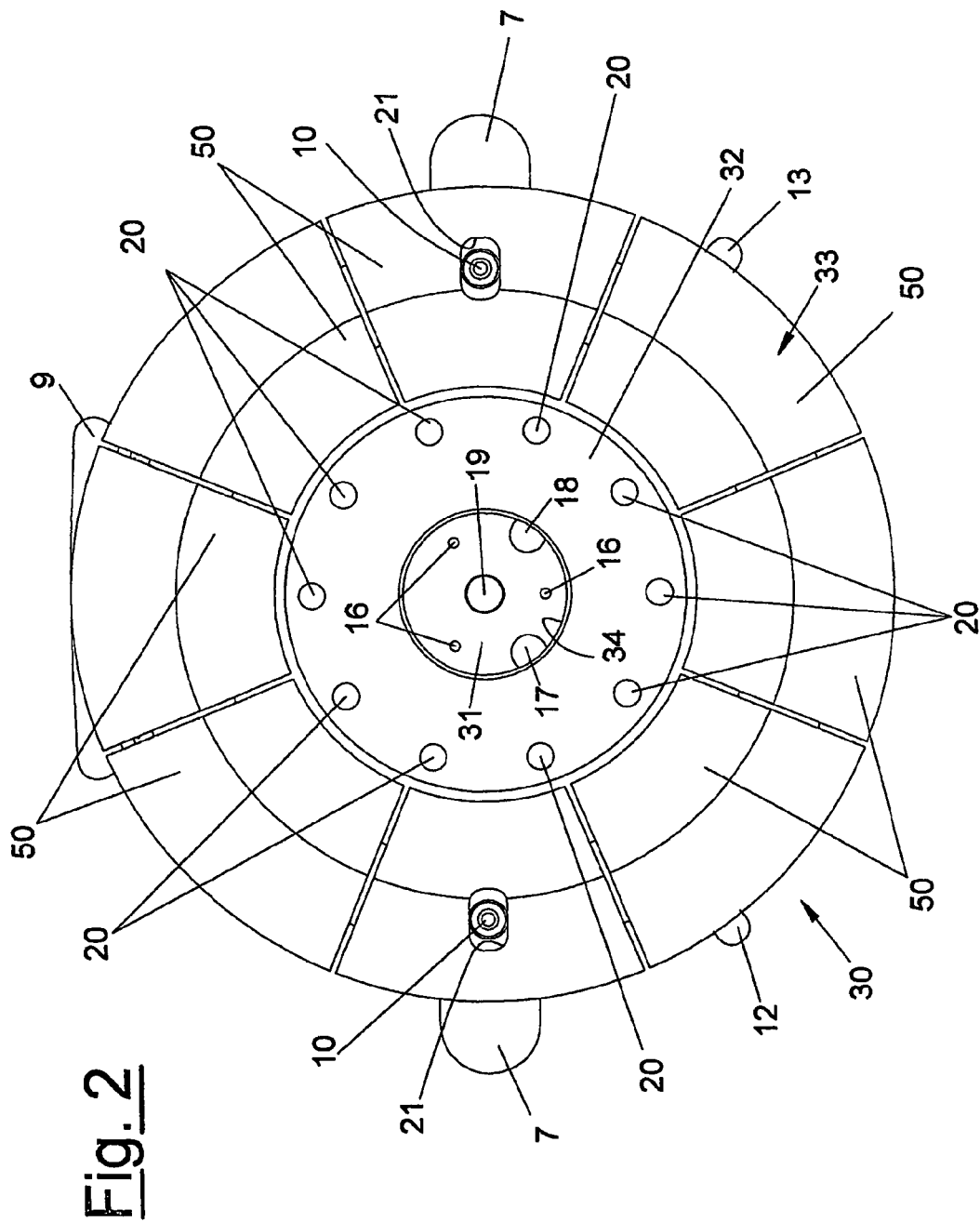
FIG. 2 is a front view of the gas burner of FIG. 1.
Figure 3:
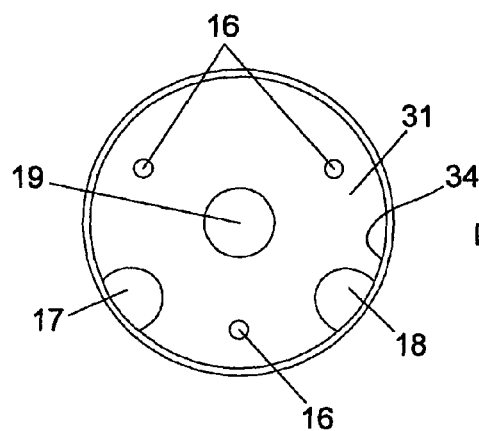
FIG. 3 is an enlarged detail of FIG. 2.
Figure 4:
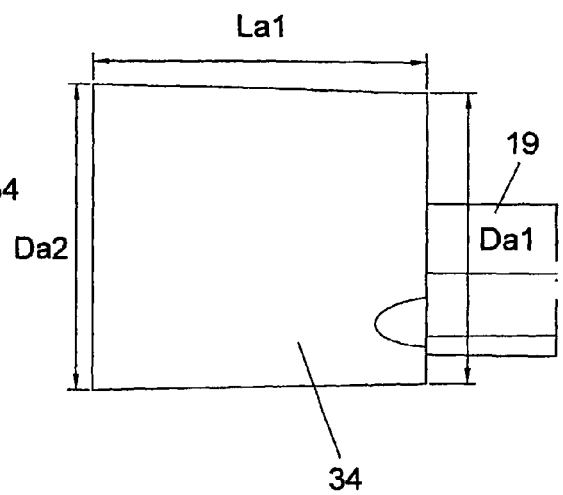
FIG. 4 is a raised side view of the enlarged detail of FIG. 3.
Figure 5:
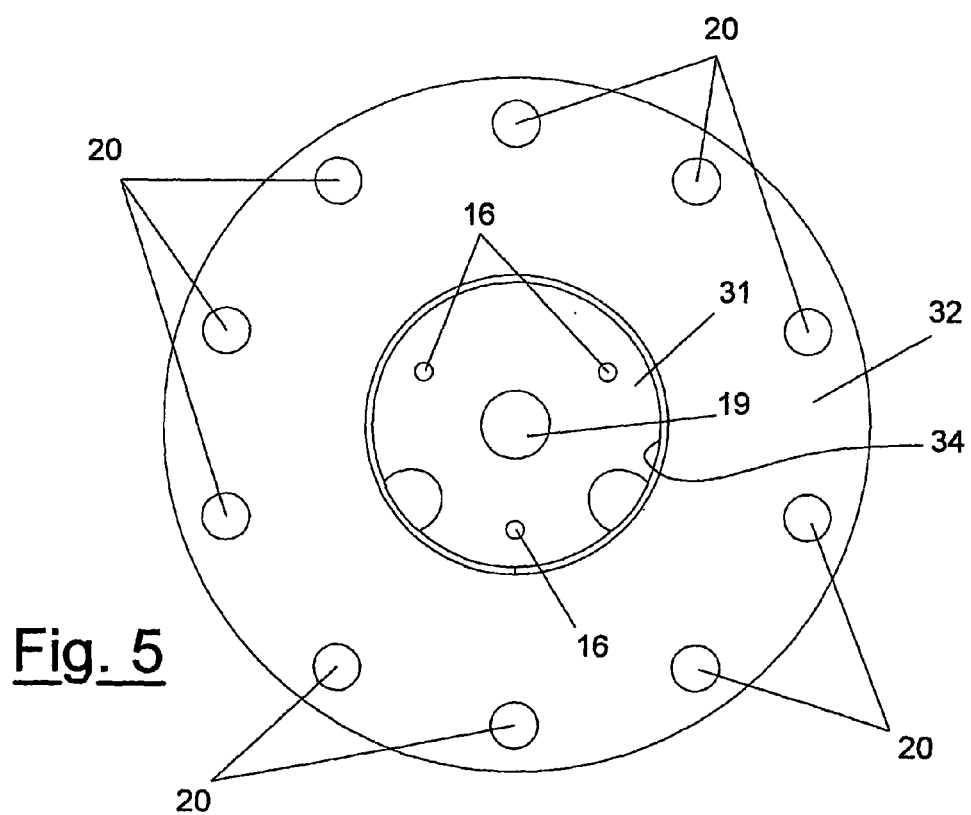
FIG. 5 is an enlarged detail of FIG. 2.
Figure 6:
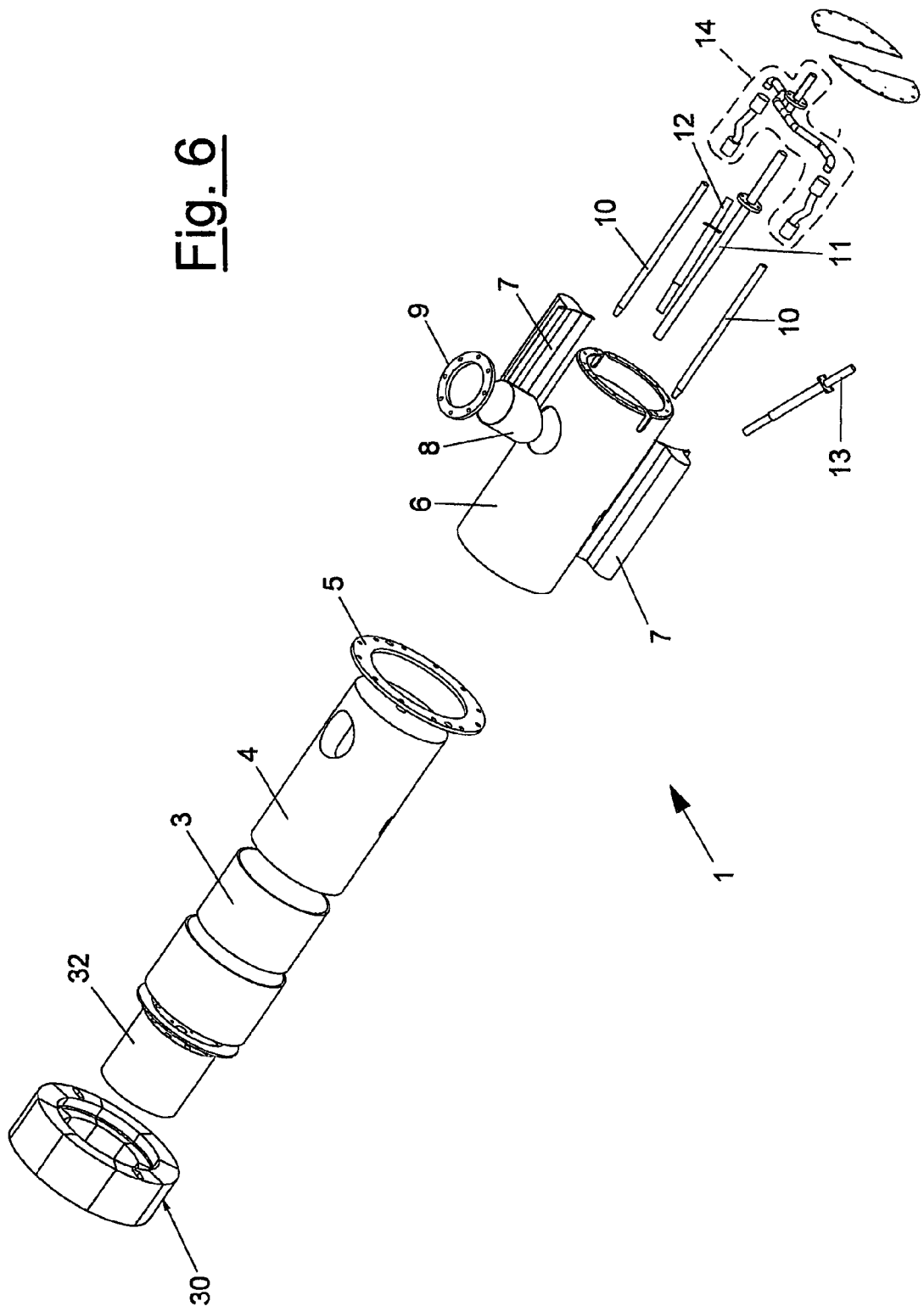
FIG. 6 is an exploded view of the burner of FIG. 1.
Figure 7:
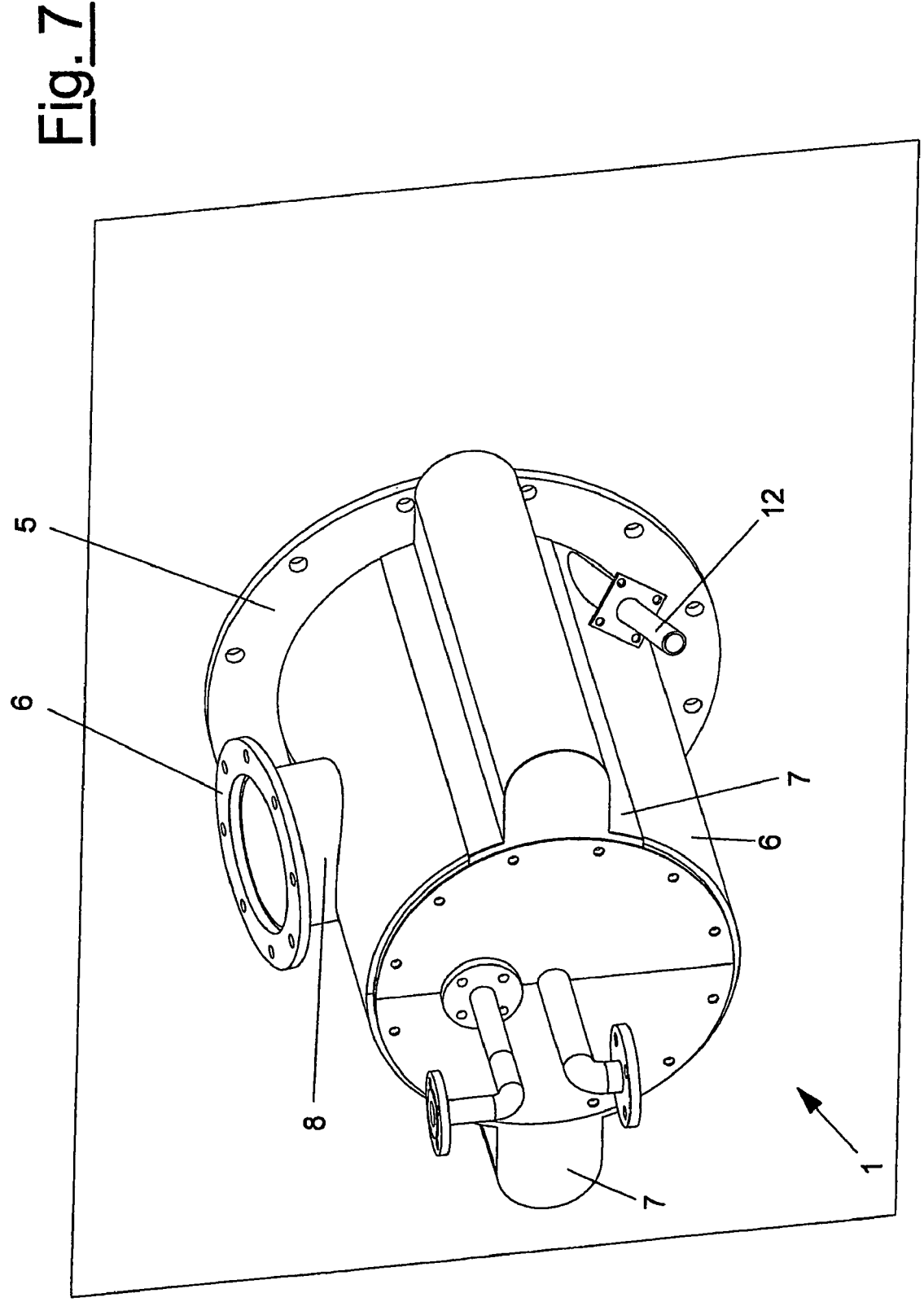
FIG. 7 is a rear perspective view of the burner of FIG. 1 applied inside an oven.
Figure 8:
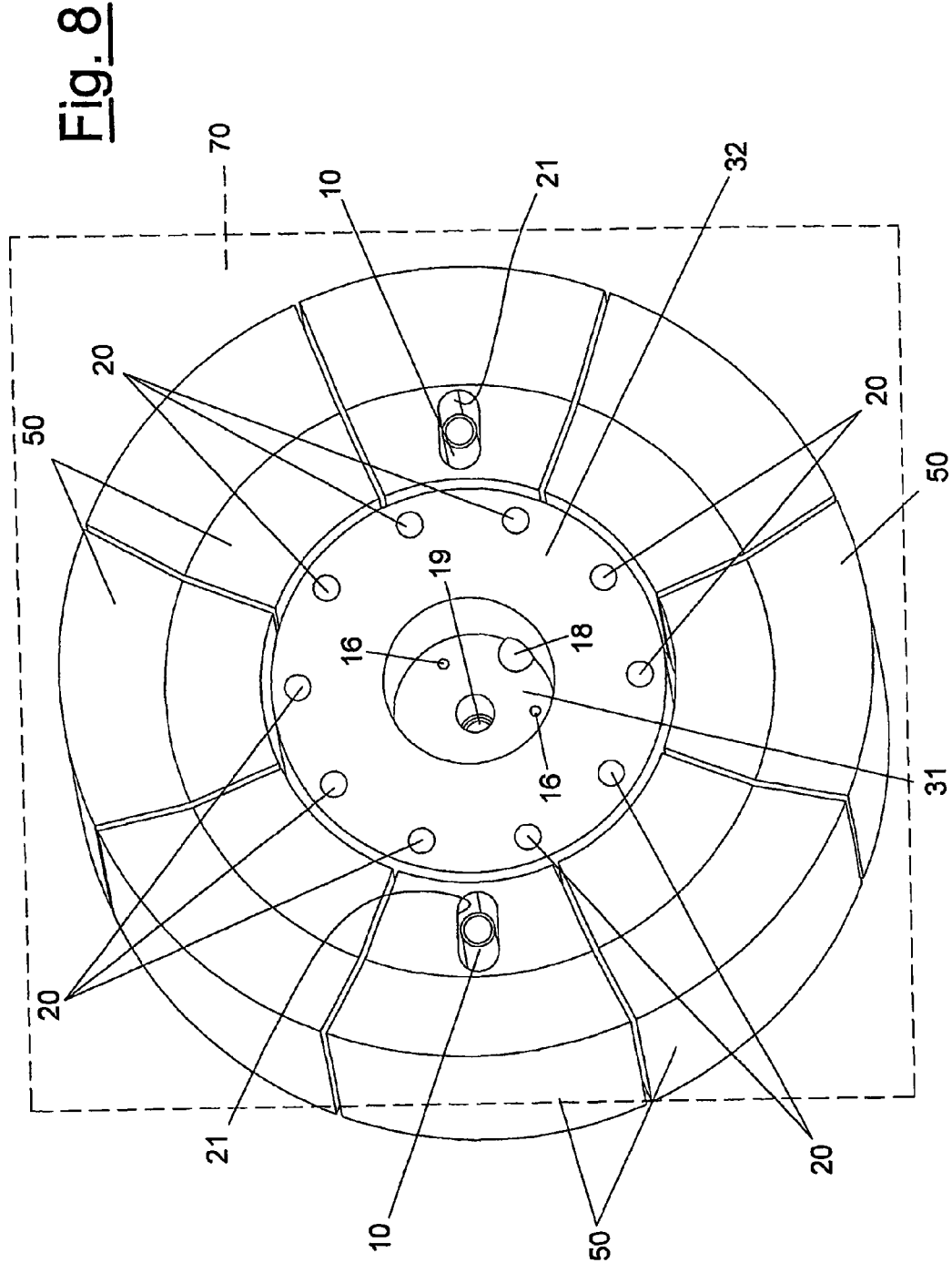
FIG. 8 is a front view of the burner of FIG. 7.
Figure 9:
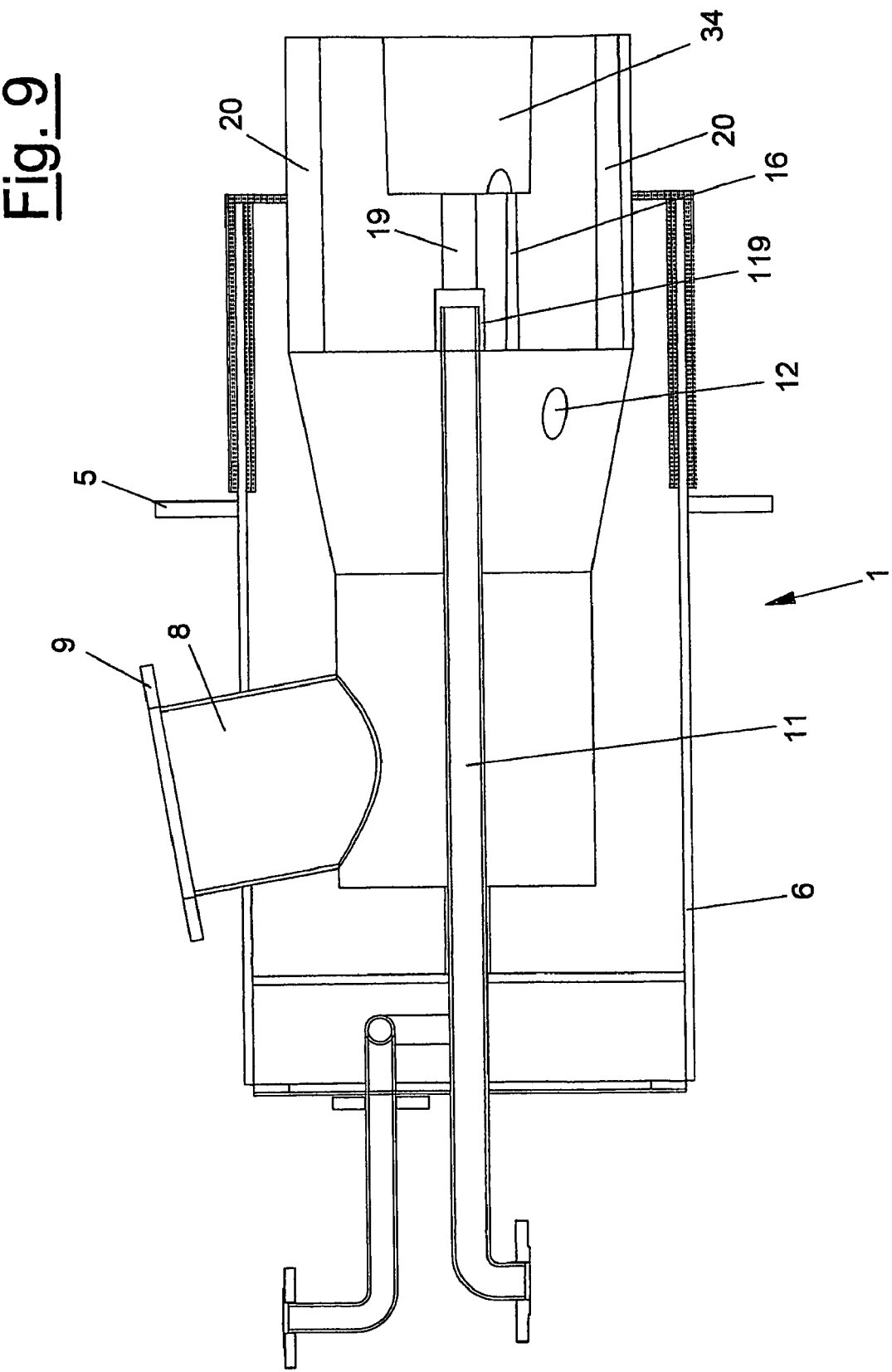
FIG. 9 is a raised left-side view of the burner of FIG. 1.
Figure 10:
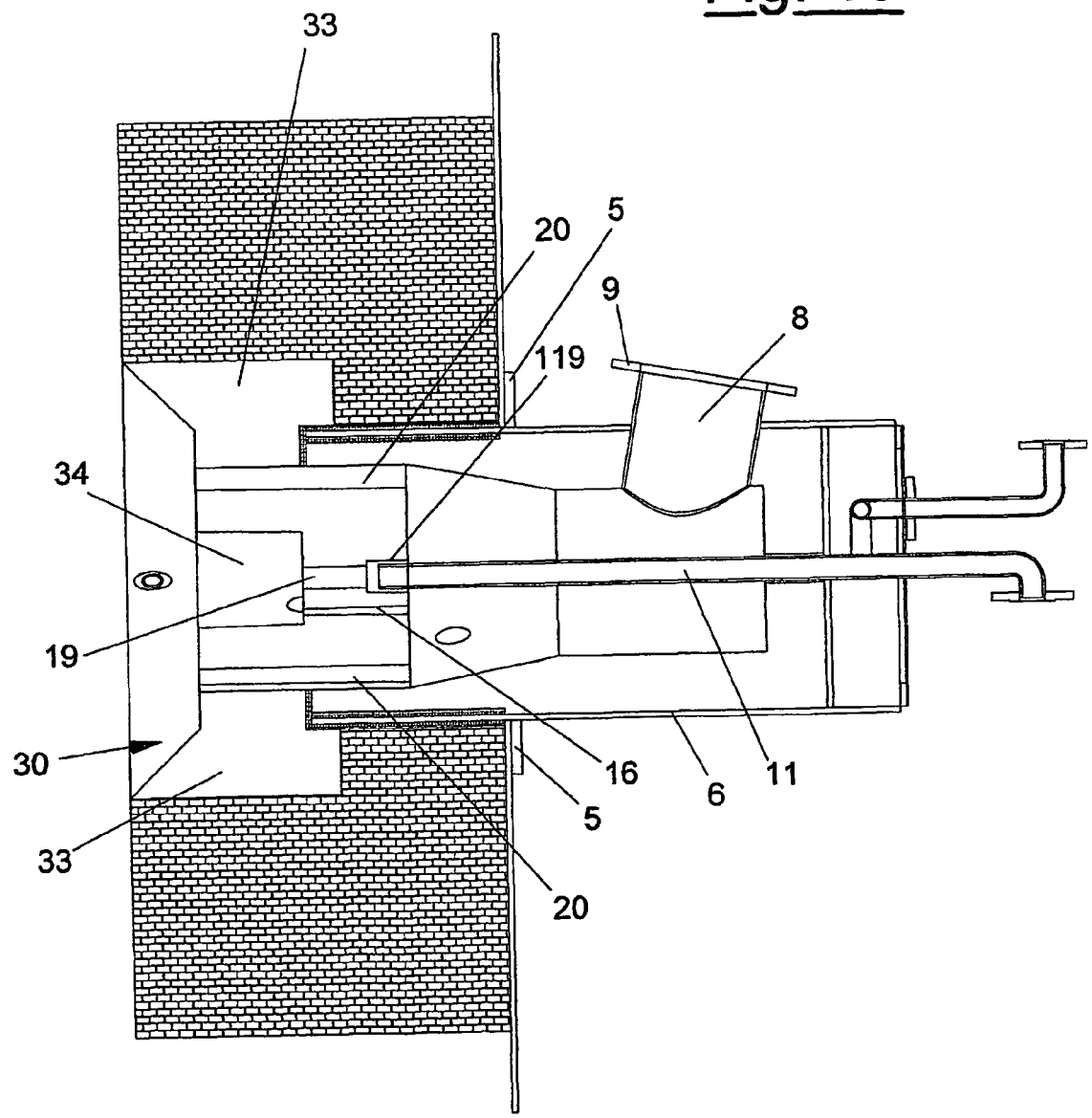
FIG. 10 is a raised right-side view of the burner of FIG. 1.
Figure 11:
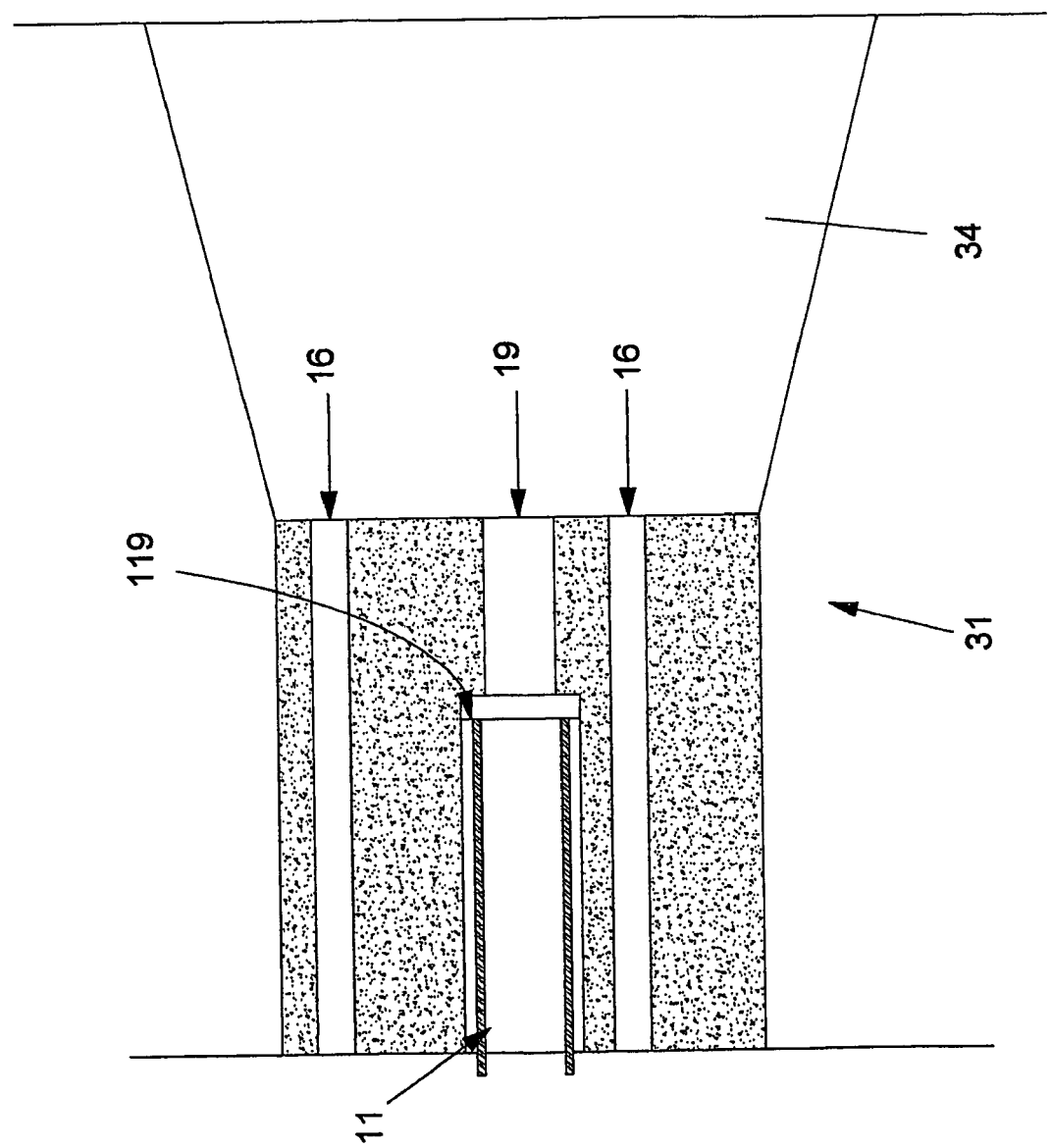
FIG. 11 is a raised right-side view of a detail of FIG. 10.

With reference to the drawings, the very low polluting emission gas burner in question is indicated, as a whole, by 1, and, in the example illustrated, according to the present invention, it comprises a main hollow cylindrical metal body 6, internally lined with a coating 4 of refractory material, a single duct 8 for the adduction of pre-heated air, an inner central lance 11 for the injection of a combustible gas, at least two outer side lances 10 for the injection of the combustible gas, a set of refractory elements indicated, as a whole, with 30, and a series of nozzles 20 for the injection of the pre-heated air into the combustion chamber of the oven.

The main hollow cylindrical metal body 6 has a side surface to which the duct 8, for the adduction of the pre-heated air, is connected.

Said main metal body 6 also contains an insulating fibre 3.

Said metal body 6 is open at a first base end, whereas at a second base end it has a housing for a gas distributor 14.

"Plenum" means the volume inside the coating 4, made of refractory material to protect the main metal body 6; said internal volume has the function of making the air stream uniform before it passes through the holes situated in the refractory elements, subsequently indicated with 31 and 32.

The burner in question can function both as a pilot in the "flame" mode (i.e. it can heat an oven to the desired temperature) and in "flameless" mode, with very low emissions of nitrogen oxides.

Said burner 1 also includes a series of calibrated drawing holes 16 for the pre-heated air, a housing 17 for a pilot device for the ignition of the burner 1 and a housing 18 for a flame detector.

Said housings 17 and 18 communicate with housings obtained in the metal portion, marked with 12 and 13, respectively.

Said housings 12 and 13 provide the mechanical support for the correct positioning of the ignition device and flame detector of the burner 1, respectively.

Said series of nozzles 20 for the injection of pre-heated air, preferably comprises ten nozzles, and preferably said series of calibrated drawing holes 16 includes three holes.

The refractory unit 30 is topologically divided, for a simpler identification, into three regions: a first region 31, a second region 32 and a third region 33, all concentric.

The first region 31 includes a cavity 34 which communicates with the plenum and with the combustion chamber of the oven, the series of calibrated drawing holes 16, the housing 17 for the ignition device of the burner 1, the housing 18 for the flame detector, and a central hole 19 from which the gas flows out and from which, optionally, the calibrated drawing of the air is effected, to cool the central lance 11 of the combustible.

The cavity 34 is in a rear position with respect to the base surface of the second region 32 of the refractory unit 30, which gives onto the combustion chamber of the oven.

Said second region 32 comprises the series of nozzles 20 for the injection of the pre-heated air into the combustion chamber of the oven, situated on the base surface of the same.

The region 32 is of an annular form and lies between the inner first region 31, and the outer third region 33.

Said third region 33, more external with respect to the second region 32, also has an annular form and lies between the region 32 and the external limit of refractory cones which connect the inner wall of the combustion chamber of the burner 1.

The third region 33 is made of refractory ashlars 50 and also comprises at least two pass-through holes 21 obtained on a base surface of the same, from which the gas flows, through said at least two outer lances 10, inside the combustion chamber.

The base surface of the second region 32 and the base surface of the third region 33 of the refractory unit 30, are preferably level and aligned.

Furthermore, the base surface of the second region 32 and the base surface of the third region 33 of the refractory unit 30 are preferably aligned with an internal wall 70 of the oven.

A certain quantity of preheated air necessary for the functioning of the burner in "pilot" mode, is drawn through the series of calibrated holes 16. In order to limit overheating of the terminal part of the inner lance 11, an air drawing section is optionally present between the central hole 19 and the central lance 11.

A region 119 is thus defined as the free section (annular crown) obtained from the difference between the surface of the central hole 19 housing the gas lance and the surface enclosed by the external diameter of the lance 11.

Once the k ratio has been defined between the hydraulic diameter of the central hole 19 housing the gas lance and the outer diameter of the lance 11, said k ratio ranges from 0.3 to 3; said k ratio preferably ranges from 0.5 to 1.5.

When it is necessary to use the burner in "pilot" mode, i.e. when the temperature of the combustion chamber of the oven does not reach the self-ignition temperature of the combustible, the burner operates with gas leaving the central lance 11.

When the combustion chamber of the oven reaches the self-ignition temperature of the combustible gas in air (i.e., for natural gas about 850° C.), it is possible to switch to the flameless mode: by operating with activation means on the control system of the combustible gas, this is injected through said at least two external side lances 10 of the gas at a rate ranging from 20 to 150 m/s.

The preheated air entering from the duct 8 is accelerated through the series of nozzles 20, the calibrated holes 16 and optionally through the region 119 and reaches rates ranging from 50 to 200 m/s in relation to the preheating temperature of the air itself.

Said preheated air then enters the combustion chamber of the oven.

The gas burner 1 is capable of functioning both in the so-called flame mode and in the flameless mode, without the necessity of installing costly hot air distribution systems, inside or outside the burner itself.

According to the present invention, in fact, once the thermal power supplied by the burner 1 has been established, it is possible to pass continuously from one mode to the other by simply varying the distribution percentage of the combustible fluid between the central inner lance 11 and said at least two external side lances 10 of the combustible gas, by simply acting on the distribution and control system of the combustible (comprising one or more valves, actuators, transmitters, etc.) without having to modify in any way the supply of comburent air.

By acting on the distribution system of the combustible fluid, it is therefore possible to obtain, by the introduction of preheated air through the series of nozzles 20, the series of calibrated holes 16 and preferably also through the region 119, a homogeneous atmosphere in which there is a mixing between combustible gas, preheated air and combusted gases so that the combustion reaction takes place in a diluted manner without the formation of a flame front.

In the mixing area of the gas with the comburent and combustion products, already upstream of the reaction, there is a reduced oxygen content, lower than atmospheric level. The limitation of the oxygen concentration allows the reaction to be developed in a greater volume. This enables the reaction to take place between more diluted reagents and it consequently develops more slowly. This limits the formation of temperature peaks, in correspondence with which the formation of nitrogen oxides (thermal NOx) would be favoured.

A known percentage of preheated air is drawn in the cavity 34 through the series of calibrated nozzles 20 in a percentage within the range of 0 to 30% with respect to the total amount of air fed to the burner, which ensures the necessary flow-rate of oxidant for a complete combustion reaction and recycling of the combusted gases.

During the pilot (or flame) functioning mode, the combustible gas is injected into the combustion chamber by means of the central inner lance 11 alone.

In the flameless mode, the gas can be injected:
parallelly with the preheated air flow
or
it can be injected so that the jets of combustible gas and preheated air meet at a pre-established distance or
it can be injected so that the jets of combustible gas and preheated air do not meet geometrically (divergent outer lances 10).

Thanks to the strong impulse of the jets of air leaving the series of nozzles 20, the series of calibrated holes 16 and possibly the injection region 119, the air itself and the gas mix with the combusted gases allowing a diluted combustion in the whole volume of the combustion chamber of the oven.

It is possible for the burner to function with gas injected either through the central inner lance 11 or through said at least two external side lances 10.

The variation in the percentage of gas distributed by the control valve, between the inner lance 11 and said at least two outer lances 10, allows the regulation of the thermal profile inside the combustion chamber and, as already mentioned, allows continuous passage from the flame functioning mode to the flameless functioning mode.

The gas is injected through the side lances with an inclination angle of the jet ranging from $-10°$ to $10°$ with respect to the injection axis of the central inner lance 11 of the combustible gas.

The distribution percentage of the gas through said at least two lances 10 ranges from 0%, in the flame mode, to 100%, in the flameless mode.

The cavity 34 preferably has an outer diameter Da2 and a length La1, and an internal diameter Da1.

The shape of the series of calibrated holes 16 does not necessarily have to be circular.

The overall outflow section of the hot comburent air from the region 31 is identified as Ai.

Once a ratio s has been defined between the depth La1 of the cavity 34 and the internal diameter Da1 of the same, said ratio s ranges from 0 to 5; said ratio s preferably ranges from 0 to 1.5.

The outer diameter Da2, moreover, is greater than or equal to the internal diameter Da1.

Once the ratio x has been defined, equal to the distance between the barycentre of a first hole of the series of calibrated holes 16 and the barycentre of a second hole of the series of calibrated holes 16, divided by a minimum diameter selected from a hydraulic diameter of the first hole and a hydraulic diameter of the second hole, said ratio x is at least equal to 1.

Said ratio x is preferably at least equal to 2.

The section of each nozzle of the series of nozzles 20 also does not necessarily have to be circular.

The overall outflow section of the hot comburent air from the second region 32 is identified as Ae.

The total outflow section Ai of air from the series of calibrated holes 16 with respect to the total outflow section Ae of air from the series of nozzles 20 has a ratio ranging from 0.01 to 0.9; it preferably has a ratio ranging from 0.05 to 0.5.

Once the ratio y has been defined, equal to the distance between the barycentre of a first nozzle of the series of nozzles 20 and the barycentre of a second nozzle of the series of nozzles 20, divided by a minimum diameter selected from an internal hydraulic diameter of the first nozzle and an internal hydraulic diameter of the second nozzle, said ratio y ranges from 1 to 10.

Said ratio y preferably ranges from 2 to 5.

Once a ratio z has been defined, equal to the distance between the barycentre of a hole of said at least two holes 21 and the barycentre of a nozzle of said series of nozzles 20, divided by a minimum diameter selected from a hydraulic diameter of the hole and an internal hydraulic diameter of the nozzle, said ratio z ranges from 1 to 50.

Said ratio z preferably ranges from 3 to 30.

The burner 1 also comprises at least two protections 7 for said at least two external side lances 10, a flange 9 connected to the duct 8 for the adduction of the preheated air, a perforated flange 5 for supporting said at least two outer lances 10.

Said at least two side protections 7 for said at least two external side lances 10 for the combustible gas, are applied on the side surface of said main metallic body 6.

From what is specified above with reference to the figures, it is evident how a gas burner according to the invention is particularly useful and advantageous. The objective indicated in the preamble of the description has thus been achieved.

Figure 12:
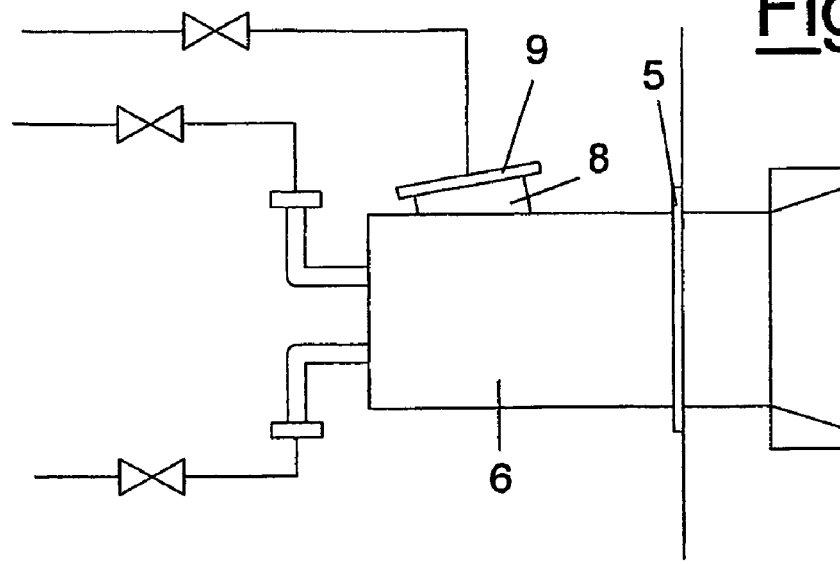
FIGS. 12 and 13 are two preferred schematic figures of a first and second burner according to the present invention.
Figure 13:
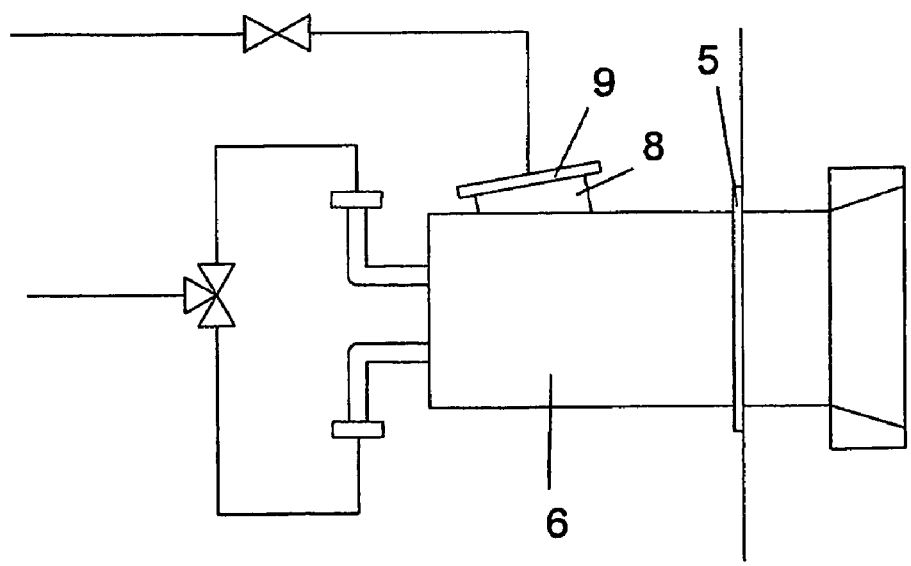

FIGS. 12 and 13 indicate a flow-rate valve for the single air duct 8, and one or two valves for the combustible gas, for two preferred, non-limiting embodiments of the present invention, respectively.

The forms of the gas burner of the invention, as also the materials, can naturally differ from what is shown for illustrative and non-limiting purposes in the drawings.

The protection scope of the invention is therefore delimited by the enclosed claims.

The invention claimed is:

1. A combustible gas burner comprising:
   a main metal body open at a first base end, having a housing for a combustible gas distributor at a second base end and internally lined with a coating of refractory material, and having a volume inside said coating that defines a plenum,
   an inner central lance for combustible gas arranged inside said main metal body,
   at least two outer side lances for combustible gas which are disposed within said main metal body, said at least two outer side lances being arranged radially outwardly with respect to said inner central lance,
   a single duct for the introduction of pre-heated air into said plenum where said single duct is connected to a side surface of said main metal body, said single duct being adapted to bring air into said plenum,
   said gas distributor associated to said housing for distributing combustible gas to said inner central lance and to said outer side lances,
   a combustible gas control system for said gas distributor,
   a refractory unit associated with said first base end,
   characterized in that
   said gas burner comprises a series of nozzles situated in said refractory unit for the injection of the pre-heated air into a combustion chamber of an oven, said series of nozzles being in communication with said plenum, said nozzles being located between the inner central lance and the outer side lances, and in that,
   said combustible gas distributor and control system comprises means for varying a distribution percentage of the combustible gas between the inner central lance and the outer side lances thereby continuously switching from a flame functioning mode of the burner, wherein the combustible gas is injected into said combustion chamber through said inner central lance alone, to a flameless functioning mode, wherein the combustible gas is injected into said combustion chamber through said outer side lances alone wherein said refractory unit comprises a first region, a second region, a third region, which are concentric, said first region in turn comprising a series of calibrated holes and a central hole, having an inner surface from which the gas flows out and which houses a tip portion of said inner central lance where said tip portion has an external diameter, wherein said calibrated holes are positioned between said central hole and said nozzles, a free annular crown being defined between the inner surface of said central hole and the external diameter of said tip portion of the inner central lance said free annular crown being in communication with said plenum thereby allowing the passage of a sufficient quantity of pre-heated air suitable for preventing the overheating of the inner central lance wherein the total outflow section of air from the series of calibrated holes with respect to the total outflow section of air from the series of nozzles has a ratio ranging from 0.01 to 0.9.

2. The gas burner according to claim 1, characterized in that said series of nozzles for the air is housed in the second region.

3. The gas burner according to claim 2, characterized in that the holes of said series of calibrated holes are at an equal distance along a coaxial circumference with the inner central lance and lying on the bottom of the cavity of the first region.

4. The gas burner according to claim 2, characterized in that the total outflow section of air from the series of calibrated holes (16) with respect to the total outflow section of air from the series of nozzles has a ratio ranging from 0.05 to 0.5.

5. The gas burner according to claim 2, characterized in that once a ratio (x) has been defined, equal to the distance between the barycentre of a first hole of the series of calibrated holes and the barycentre of a second hole of the series of calibrated holes, divided by a minimum diameter selected from a hydraulic diameter of the first hole and a hydraulic diameter of the second hole, said ratio (x) is at least equal to 1.

6. The gas burner according to claim 5, characterized in that said ratio (x) is at least equal to 2.

7. The gas burner according to claim 1, characterized in that said series of nozzles comprises ten nozzles, and in that said series of calibrated holes comprises three calibrated holes.

8. The gas burner according to claim 1, characterized in that said first region comprises a cavity communicating with the combustion chamber and into which the air from the series of calibrated holes flows together with the combustible gas injected through the inner central lance.

9. The gas burner according to claim 8, characterized in that said cavity has an outer diameter (Da2), an internal diameter (Da1) and a depth (La1), once a ratio (s) has been defined between the depth (La1) of the cavity and the internal diameter (Da1) of the same, said ratio (s) ranges from 0 to 5.

10. The gas burner according to claim 9, characterized in that the outer diameter (Da2) of said cavity is greater than the internal diameter (Da1) of the same.

11. The gas burner according to claim 9, characterized in that said ratio (s) ranges from 0 to 1.5.

12. The gas burner according to claim 1, characterized in that the first region houses a flame detector in the housing and the ignition device situated in the housing of the burner.

13. The gas burner according to claim 1, characterized in that the nozzles of said series of nozzles are situated at an equal distance along a coaxial circumference with the inner central lance and lying on a base surface of the second region.

14. The gas burner according to claim 1, characterized in that said burner comprises at least two pass-through holes for housing said at least two outer side lances.

15. The gas burner according to claim 14, characterized in that once a ratio (z) has been defined, equal to the distance between the barycentre of a hole of said at least two holes and the barycentre of a nozzle of said series of nozzles, divided by a minimum diameter selected from a hydraulic diameter of the hole and an internal hydraulic diameter of the nozzle, said ratio (z) ranges from 1 to 50.

16. The gas burner according to claim 15, characterized in that said ratio (z) ranges from 3 to 30.

17. The gas burner according to claim 1, characterized in that said at least two pass-through holes are situated at an equal distance along a coaxial circumference with the inner central lance and lying on a base surface of the third region.

18. The gas burner according to claim 1, characterized in that once a ratio (y) has been defined, equal to the distance between the barycentre of a first nozzle of the series of nozzles and the barycentre of a second nozzle of the series of nozzles, divided by a minimum diameter selected from an internal hydraulic diameter of the first nozzle and an internal hydraulic diameter of the second nozzle, said ratio (y) ranges from 1 to 10.

19. The gas burner according to claim 18, characterized in that said ratio (y) ranges from 2 to 5.

20. The gas burner according to claim 1, characterized in that said main metal body further comprises an insulator made of fiber.

21. The gas burner according to claim 1, characterized in that said burner comprises at least two side protections for said at least two outer side lances for the combustible gas.

22. The gas burner according to claim 1, characterized in that said protections are applied to the main metal body.

23. The gas burner according to claim 1, characterized in that said burner comprises a perforated flange for supporting said at least two outer side lances.

24. The gas burner according to claim 1, characterized in that said central hole has a hydraulic diameter, said central inner lance having an outer diameter, having defined a ratio (k) between the hydraulic diameter of said central hole and the outer diameter of the lance (11), said ratio (k) ranges from 0.3 to 3.

25. The gas burner according to claim 24, characterized in that said ratio (k) ranges from 0.5 to 1.5.

26. A combustible gas burner comprising:
a main metal body open at a first base end, having a housing for a combustible gas distributor at a second base end and internally lined with a coating of refractory material, and having a volume inside said coating that defines a plenum,
an inner central lance for combustible gas arranged inside said main metal body,
at least two outer side lances for combustible gas which are disposed within said main metal body, said at least two outer side lances being arranged radially outwardly with respect to said inner central lance,
a single duct for the introduction of pre-heated air into said plenum where said single duct is connected to a side surface of said main metal body, said single duct being adapted to bring air into said plenum,
said gas distributor associated to said housing for distributing combustible gas to said inner central lance and to said outer side lances,
a combustible gas control system for said gas distributor,
a refractory unit associated with said first base end,
characterized in that
said refractory unit comprises, in sequence from the innermost to the outermost, a first region, a second annular region and a third annular region which are concentric to said inner central lance, wherein
said first region comprises a central hole from which the combustible gas flows out and which houses a tip portion of said inner central lance and a series of calibrated holes communicating with said plenum and with a cavity that is defined in said first region and communicates with the combustion chamber of an oven, the pre-heated air from said series of calibrated holes flowing into said cavity together with the gas injected through said inner central lance, said calibrated holes being positioned between said central hole and said nozzles,
said second annular region comprising a series of nozzles communicating with said plenum for the injection of the pre-heated air into said combustion chamber of an oven and said third annular region comprising at least two pass-through holes for housing said at least two outer side lances both said series of calibrated holes and said series of nozzles being in communication with said plenum and being located between the inner central lance and the outer side lances, and in that, said combustible gas distributor and control system comprise means for varying a distribution percentage of the combustible gas between the inner central lance and the outer side lances thereby continuously switching from a flame functioning mode of the burner, wherein the combustible gas is injected into said combustion chamber through said inner central lance alone, to a flameless functioning mode, wherein the combustible gas is injected into said combustion chamber through said outer lances, wherein the total outflow section of air from the series of calibrated holes with respect to the total outflow section of air from the series of nozzles has a ratio ranging from 0.01 to 0.9.

27. A combustible gas burner comprising:

a main metal body open at a first base end, having a housing for a combustible gas distributor at a second base end and internally lined with a coating of refractory material and having a volume inside said coating that defines a plenum, an inner central lance for combustible gas arranged inside said main metal body, at least two outer side lances for combustible gas which are disposed within said main metal body, said at least two outer side lances being arranged radially outwardly with respect to said inner central lance, a single duct for the introduction of pre-heated air into said plenum where said single duct is connected to a side surface of said main metal body, said single duct being adapted to bring air into said plenum, said gas distributor associated to said housing for distributing combustible gas to said inner central lance and to said outer side lances, a combustible gas control system for said gas distributor, a refractory unit associated with said first base end, characterized in that said refractory unit comprises, in sequence from the innermost to the outermost, a first region, a second annular region and a third annular region which are concentric to said inner central lance, wherein said first region comprises a central hole from which the combustible gas flows out and which houses a tip portion of said inner central lance and a series of calibrated holes communicating with said plenum and with a cavity that is defined in said first region and communicates with the combustion chamber of an oven, the pre heated air from said series of calibrated holes flowing into said cavity together with the gas injected through said inner central lance said calibrated holes being positioned between said central hole and said nozzles, said second annular region comprising a series of nozzles communicating with said plenum for the injection of the pre-heated air into said combustion chamber of an oven and said third annular region comprising at least two pass-through holes for housing said at least two outer side lances both said series of calibrated holes and said series of nozzles being in communication with said plenum and being located between the inner central lance and the outer side lances, and in that, said combustible gas distributor and control system comprise means for varying a distribution percentage of the combustible gas between the inner central lance and the outer side lances, activation means of said control system being provided to thereby continuously switching from a flame functioning mode of the burner, wherein the combustible gas is injected into said combustion chamber through said inner central lance alone, to a flameless functioning mode, wherein the combustible gas is injected into said combustion chamber through said outer side lances alone wherein the total outflow section of air from the series of calibrated holes with respect to the total outflow section of air from the series of nozzles has a ratio ranging from 0.01 to 0.9.

28. A combustible gas burner comprising:

a main metal body open at a first base end, having a housing for a combustible gas distributor at a second base end and internally lined with a coating of refractory material, and having a volume inside said coating that defines a plenum, an inner central lance for combustible gas arranged inside said main metal body, at least two outer side lances for combustible gas which are disposed within said main metal body, said at least two outer side lances being arranged radially outwardly with respect to said inner central lance, a single duct for the introduction of pre-heated air into said plenum where said single duct is connected to a side surface of said main metal body, said single duct being adapted to bring air into said plenum, said gas distributor associated to said housing for distributing combustible gas to said inner central lance and to said outer side lances, a combustible gas control system for said gas distributor, a refractory unit associated with said first base end, characterized in that said refractory unit comprises, in sequence from the innermost to the outermost, a first region, a second annular region and a third annular region which are concentric to said inner central lance, wherein said first region comprises a central hole from which the combustible gas flows out and which houses a tip portion of said inner central lance, a series of calibrated holes communicating with said plenum and with a cavity that is defined in said first region and communicates with the combustion chamber of an oven, the pre-heated air from said series of calibrated holes flowing into said cavity together with the gas injected through said inner central lance, a housing that houses an ignition device and a housing that houses a flame detector device said calibrated holes being positioned between said central hole and said nozzles;

said second annular region comprising a series of nozzles communicating with said plenum for the injection of the pre-heated air into said combustion chamber of an oven and said third annular region comprising at least two pass-through holes for housing said at least two outer side lances both said series of calibrated holes and said series of nozzles being in communication with said plenum and being located between the inner central lance and the outer side lances, and in that, said combustible gas distributor and control system comprise means for varying a distribution percentage of the combustible gas between the inner central lance and the outer side lances, activation means of said control system being provided to thereby continuously switching from a flame functioning mode of the burner, wherein the combustible gas is injected into said combustion chamber through said inner central lance alone and the combustion of said combustible gas with the pre-heated air drawn through said series of calibrated holes takes place in a flame mode, upon ignition of said ignition device, to a flameless functioning mode, wherein, at a temperature above the self-ignition device of the gas in air the combustible gas is injected into said combustion chamber through said outer side lances alone and the combustion of said gas with the pre-heated air drawn through said series of calibrated holes and said series of nozzles takes place in a flameless mode inside said combustion chamber wherein the total outflow section of air from the series of calibrated holes with respect to the total outflow section of air from the series of nozzles has a ratio ranging from 0.01 to 0.9.

* * * * *